United States Patent [19]

Chekirda

[11] 4,099,777
[45] Jul. 11, 1978

[54] TELESCOPIC SEAT POSITIONING MECHANISM

[75] Inventor: Russell F. Chekirda, Morristown, Tenn.

[73] Assignee: Lear Siegler, Inc., Morristown, Tenn.

[21] Appl. No.: 792,614

[22] Filed: May 2, 1977

[51] Int. Cl.² .............................................. B60N 1/02
[52] U.S. Cl. .................................................... 297/375
[58] Field of Search ................ 248/188.5, 410, 354 R, 248/355; 297/354, 355, 374, 375

[56] References Cited

U.S. PATENT DOCUMENTS

| | | | |
|---|---|---|---|
| 2,806,723 | 9/1957 | Fairclough | 248/188.5 |
| 3,271,071 | 9/1966 | Tabor | 297/375 |
| 3,356,411 | 12/1967 | Homier et al. | 297/355 |
| 3,383,135 | 5/1968 | Posh | 297/355 |
| 3,876,248 | 4/1975 | Gillentine | 297/375 |
| 3,893,730 | 7/1975 | Homier et al. | 297/375 |

Primary Examiner—James C. Mitchell
Attorney, Agent, or Firm—Reising, Ethington, Barnard, Perry & Brooks

[57] ABSTRACT

Seat positioning mechanism of the type including an elongated thin-walled housing telescopically receiving a rod with friction lock washers operable to restrain the rod against movement with respect to the housing in any selected position. The invention includes a construction for increasing the locking efficiency of the lock washers and reducing the cross-section of the housing. A slot is formed in the wall of the housing, and one end of the slot is located on the housing wall at the outer boundary of the housing to define a fulcrum. The other end of the slot forms a stop on an inwardly depressed portion of the housing wall. The lock washers have lever arms that project into the slot. The fulcrum is curved to minimize the likelihood of sideways cocking of the lock washers. Also disclosed is a novel release mechanism including a shaft rotatably supported in a mounting bracket secured to the housing. A pusher member in the form of an eccentric cylindrical projection on the end of the shaft projects part way into the housing. When the shaft is rotated to an active position, the projection forces the lock washers against a return spring to the unlock position. when the shaft returns to an inactive position, the lock washers return to the lock position.

30 Claims, 11 Drawing Figures

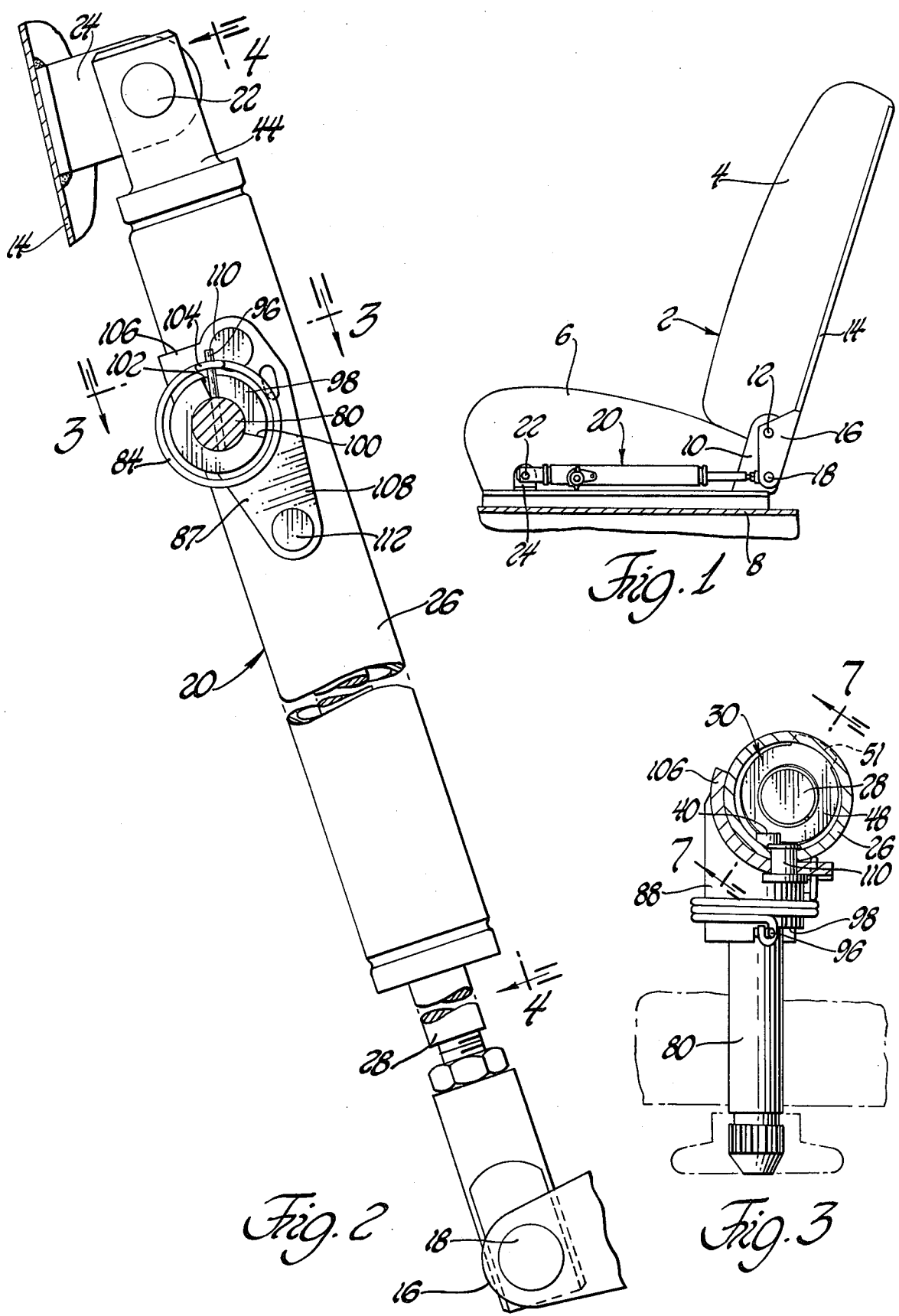

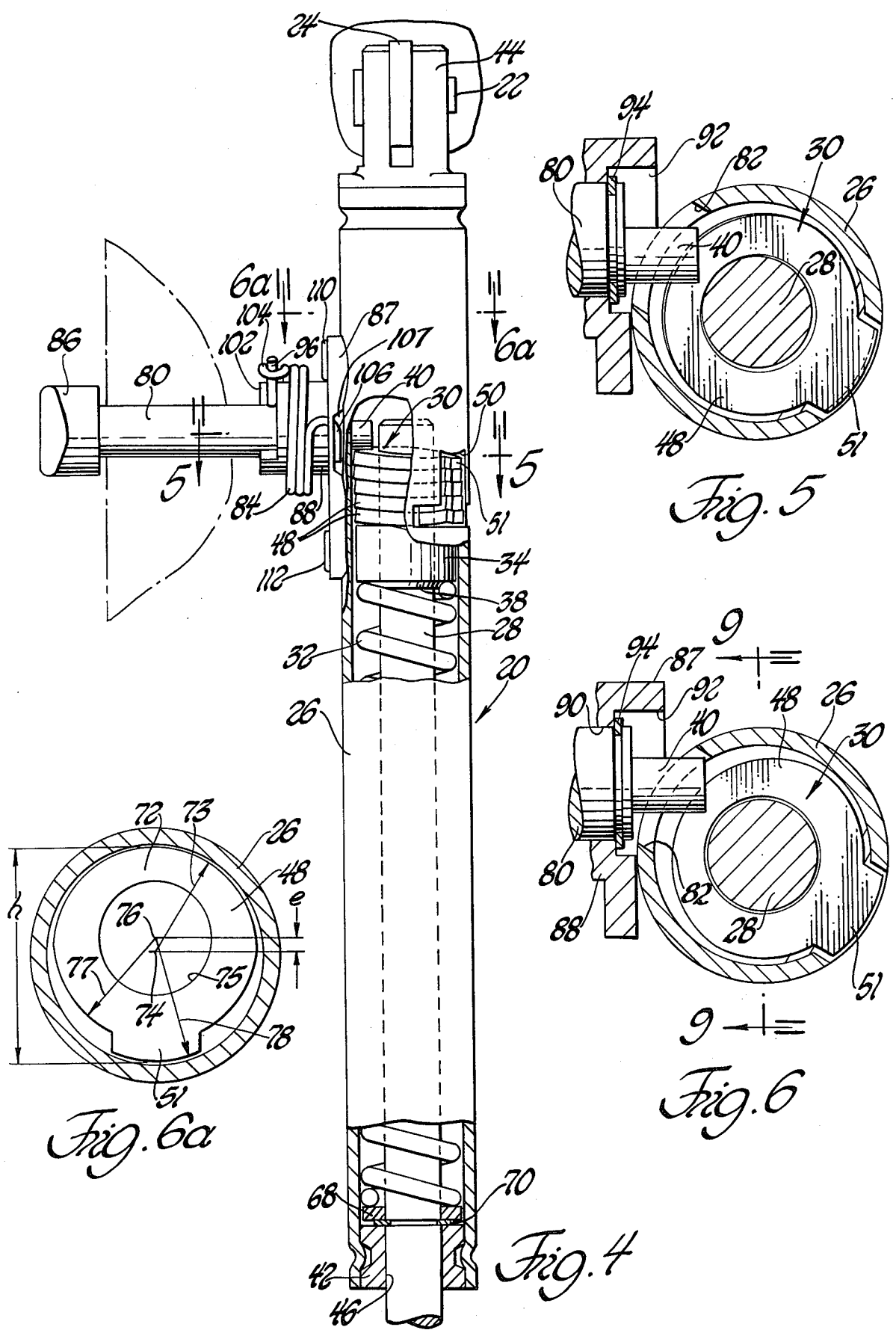

TELESCOPIC SEAT POSITIONING MECHANISM

BACKGROUND OF THE INVENTION

1. Field of the Invention

This invention relates generally to seat positioning mechanisms, and is particularly concerned with seat positioning mechanisms of the type wherein a pair of members slidably connected for telescopic movement with respect to each other are locked in selected positions with respect to each other by friction lock means.

It is well known in the prior art to position seat backs by frictionally engaging a rod with washers having openings receiving the rod. The rod receiving openings of the washers are larger than the rod so that when the washers are positioned transversely of the rod, the rod is free to move. When the washers are tilted from the transverse position, the edge of the rod receiving openings of the washers frictionally engages the rod. Examples of this type of positioning mechanism are disclosed in U.S. Pat. Nos. 980,049; 2,595,240; 2,806,723; 3,206,248; 3,271,071; 3,356,411; 3,419,306 and 3,893,730 as well as German Patent Publication 1852701 of May 30, 1962.

Typically, present mechanisms of this type include an elongated thin-walled housing with a rod slidably received in the housing for telescopic movement with respect to the housing. Lock washers are mounted in the housing, and the rod is received in openings in the lock washers. The lock washers engage a fulcrum located inwardly of the outer boundary of the housing walls. The lock washers are biased to a lock position tilted about the fulcrum by a spring to frictionally restrain the rod against movement. A release mechanism is selectively operable to move the lock washers from the tilted position in frictional engagement with the rod to a transverse, unlock position with respect to the rod, in which transverse position the rod is free to move since the rod receiving openings of the washers are out of frictional engagement with the rod. See, for example, U.S. Pat. Nos. 2,806,723; 3,271,071; 3,356,411 and 3,893,730.

It is obviously desirable to be able to reduce the cross-sectional size of such mechanism so that they can be used in smaller spaces. This is particularly the case with automobile seats where it is necessary to minimize the space required for installation of the positioning mechanism.

A particular problem in designing seat positioning mechanisms of this type is that of providing an adequate frictional force between the lock washers and the rod received in the housing of the mechanism to lock the rod against movement relative to the housing. A major factor in determining the frictional force between the washers and the rod is the distance between the fulcrum engaged by the washers and the longitudinal axis of the rod. This places limits on the cross-sectional dimensions of the housing, as well as the size of the lock washers.

Another factor that effects the size of the mechanism is the manner in which the lock washers are actuated by a release mechanism from their lock positions in frictional engagement with the rod to their unlock positions out of frictional engagement with the rod. Typically, the release mechanism includes a shaft mounted transversely in the housing that extends from one side to the other of the housing. The shaft is generally formed with a cam surface or the like that is movable upon rotation of the shaft into engagement with the lock washers to move the lock washers to their unlock position against the force of a return spring. See, for example, U.S. Pat. Nos. 3,271,071 and 3,893,730. A further expense involved in the manufacture of this type of seat positioning mechanism is the difficulty of securing the release mechanism to the housing of the assembly.

SUMMARY OF THE INVENTION

An object of this invention is to provide a seat positioning mechanism of the general type described in the preceding paragraphs having a lock washer and fulcrum configuration that produces a more efficient locking couple between the rod and lock washers to permit a substantial reduction in the cross-sectional size of the housing.

A further object is to provide a seat positioning mechanism of the general type described in the preceding paragraphs having a release mechanism that can be secured to the housing in several angular positions relative to the longitudinal axis of the housing and can also accommodate a housing having a smaller cross-sectional size.

A further object is to provide a seat positioning mechanism of the general type described in the preceding paragraphs that can be easily fabricated and assembled together.

A seat positioning mechanism according to the present invention includes an elongated thin-walled housing having a rod receiving opening formed in one end. A rod is slidably mounted in the housing for telescopic movement between extended and retracted positions. A slot is formed in the wall of the housing, the slot having first and second end portions extending transversely of the longitudinal axis of the housing. The first end portion is located on the wall of the housing at the outer boundary of the housing and defines a fulcrum for lock washers. An inwardly depressed portion is formed on the wall of the housing that projects inwardly from the outer boundary of the housing, and the second end portion of the slot is located on the inwardly depressed portion to provide a stop for the lock washers. The lock washers are formed with a lever arm that projects from the outer periphery into the slot between the first and second end portions of the slot. A plunger and return spring biases the washers about the fulcrum at the first end of the slot into a frictional lock engagement with the rod. The first end portion of the slot is curved such that the fulcrum projects outwardly from the first end of the slot. Contact between the fulcrum and lever is at the central portion of the fulcrum to minimize the likelihood of sideways cocking of the washers due, for example, to manufacturing errors in forming the slot.

The seat positioning mechanism also includes a novel release means having a shaft rotatably mounted on a bracket secured to the housing. One end of the shaft is formed with a pusher member in the form of a cylindrical projection that is eccentric to the axis of rotation of the shaft. The cylindrical projection extends part way into the housing and is engageable with the lock washers on the side of the rod opposite the fulcrum. When the shaft is rotated in one direction, the cylindrical projection forces the lock washers to their unlock position against the return spring to permit free movement of the rod with respect to the housing. Rotation of the shaft in the opposite direction releases the lock washers, and the return spring forces the lock washers back to their lock position in frictional engagement with the rod. A release return spring biases the release mechanism to the inactive position in which the cylindrical projection permits the lock washers to remain in their lock position.

Other objects, advantages and features of the invention will become apparent from the following description taken in connection with the accompanying drawings.

DESCRIPTION OF THE DRAWINGS

FIG. 1 is an elevational view of a vehicle seat having a seat positioning mechanism embodying the invention installed thereon;

FIG. 2 is an enlarged view of the seat positioning mechanism shown in FIG. 1 with the mechanism in its extended position;

FIG. 3 is a sectional view taken on lines 3—3 of FIG. 2;

FIG. 4 is a view of the seat positioning mechanism of FIG. 2 as seen along lines 4—4 of FIG. 2 with portions of the housing being broken away to show the parts in an extended and locked condition restrained against relative movement;

FIG. 5 is a sectional view taken on lines 5—5 of FIG. 4 with the parts in the locked condition;

FIG. 6 is a sectional view, similar to FIG. 5 with the parts shown in an unlocked condition to permit extension of the mechanism;

FIG. 6a is a view illustrating the position of one of the lock washers during installation, the housing cross-section being the undeformed portion as taken approximately on lines 6a—6a of FIG. 4;

DESCRIPTION OF THE PREFERRED EMBODIMENTS

Figure 7:
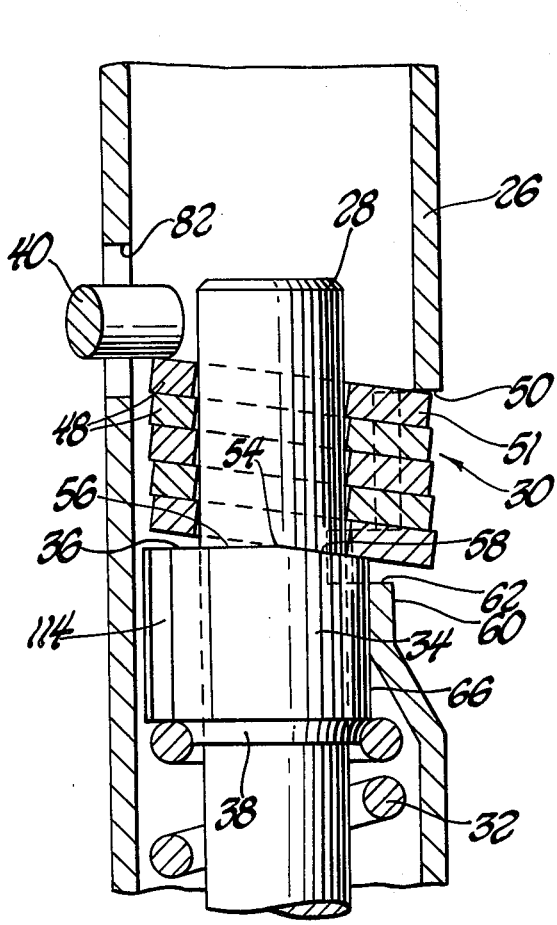
FIG. 7 is an enlarged fragmentary sectional view taken on lines 7—7 of FIG. 3 with the parts shown in the locked condition.

In FIG. 1, reference numeral 2 collectively designates a vehicle seat having a bottom portion 6 and a back portion 4. The seat 2 is mounted on the floor 8 of a vehicle. The bottom portion 6 includes a seat bottom frame 10, and the back portion 4 includes a seat back frame 14. The seat assembly illustrated in FIG. 1 includes a support frame 16 mounted on the frame 14, and the seat back frame 14 and seat bottom frame 10 are hinged together by a pin 12 mounted in the support frame member 16. The back portion 4 is pivotally movable with respect to the bottom portion 6.

The angular position of the seat back portion 4 with respect to the seat bottom portion 6 is determined by an extensible and retractable seat positioning mechanism indicated collectively by reference numeral 20. One end of the seat positioning mechanism 20 is connected with the support frame 16 by a pin 18, and the other end of the mechanism 20 is connected by a pin 22 to a bracket 24, the bracket 24 in turn being secured to a rail fixed to the floor 8. The mechanism 20 is shown in its fully retracted position in FIG. 1, and extends from the extended position as the seat back portion 4 is pivoted rearwardly in a counter-clockwise direction to various inclined positions with respect to the seat bottom portion 6. Obviously the mechanism 20 can be installed in any position between its fully retracted and fully extended positions with the seat back upright to permit any desired amount of forward or rearward tilting of the seat back within the limits of the extreme lengths of the mechanism 20.

The seat positioning mechanism 20 includes a pair of elongated members 26 and 28 which are slidably connected for telescopic movement between extended and retracted positions with respect to each other. The elongated member 26 is in the form of a tubular housing, and the elongated member 28 is in the form of a rod. The mechanism 20 further includes friction lock means 30 (FIGS. 3 through 10) carried by member 26, the friction lock means 30 having a lock position shown in FIGS. 4, 5 and 7 in frictional engagement with the member 28 to frictionally restrain the members 26 and 28 against relative movement with respect to each other, and an unlock position shown in FIGS. 6, 8 and 9 to permit free relative movement of members 26 and 28.

The friction lock means 30 and member 28 are interconnected by locking and biasing means including a return spring 32 and a locking sleeve or plunger 34. The plunger 34 has a base portion 36 at one end and a spring seat portion 38 at the other end. The base 36 extends transversely of the longitudinal axis of members 26 and 28 and engages the friction lock means on one side thereof. The return spring 32 is connected between member 28 and the spring seat portion 38 of plunger 34 to resiliently urge the friction lock means 30 toward its lock position.

Figure 8:
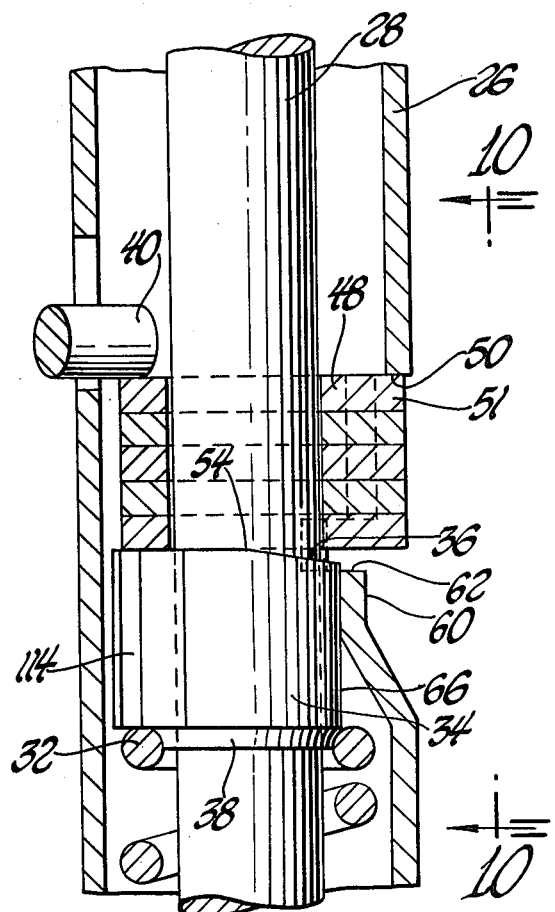
FIG. 8 is a view similar to FIG. 7 with the parts shown in the unlocked condition.
Figure 9:
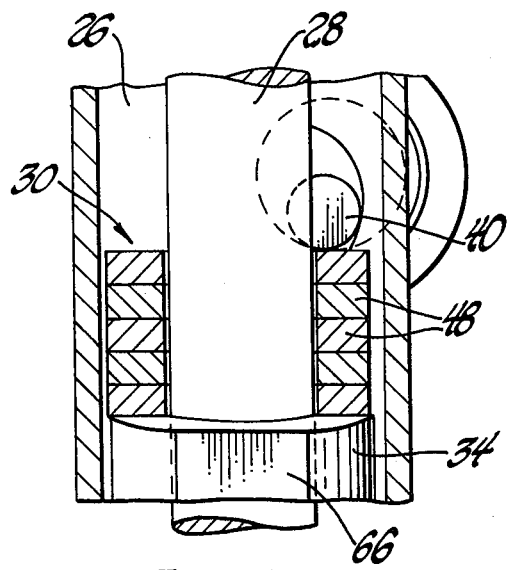
FIG. 9 is a sectional view taken on lines 9—9 of FIG. 6.

The mechanism 20 further includes release means comprising a pusher member 40 in the form of a cylindrical projection eccentrically mounted with respect to an axis of rotation transverse to the member 26 for selective rotation between an inactive position shown in FIGS. 4, 5 and 7 permitting the friction lock means 30 to assume the lock position, and an active position shown in FIGS. 6, 8 and 9 in which the release means 40 holds the friction lock means 30 in the unlocked position against the force of the return spring 32.

Mounted in one end of the tubular housing 26 is a bushing 42, and mounted in the other end of the housing 26 is a clevis or end fitting 44. The end fitting 44 is secured to the bracket 24 in FIG. 2 by the pin 22. The end fitting 44 and bushing 42 are swaged to the tubular housing 26. Bushing 42 provides an opening 46 at the end of the housing 26.

Rod 28 is slidably supported in the opening 46 of bushing 42. The friction lock means 30 comprises a plurality of lock washers (five in the illustrated embodiment) located in the housing 26. The lock washers 48 have aligned rod openings which receive the rod 28. The lock washers are disposed substantially transversely of the longitudinal axis of the rod in the unlock position as shown in FIGS. 6, 8 and 9, and are disposed at an acute angle with respect to the longitudinal axis of the rod 28 so that the edges of the rod receiving openings of the washers frictionally engage the rod in the lock position as shown in FIGS. 4, 5 and 7.

A fulcrum 50 is defined in the outer boundary of the housing 26 intermediate the ends thereof. The base portion 36 of the plunger 34 is urged by the return spring 32 to cause the lock washers 48 to tilt about the fulcrum 50 to the lock position. In the illustrated embodiment, the tubular housing 26 is formed with a slot 52 and one end of the slot 52 forms the fulcrum 50. Each of the washers 48 has a lever arm 51 formed thereon which projects into the slot 52. The lever arm 51 of the washer 48 closest to the end fitting 44 is engaged with the fulcrum 50 as shown in FIGS. 7, 8 and 10.

The base 36 of the plunger 34 is formed with a contact portion 54 that engages the lock washers 48 on the side thereof opposite the fulcrum 50. The base 36 is formed with a pair of surfaces 56 and 58 on opposite sides of the contact portion 54 as shown in FIG. 7, and surface 58 makes an acute angle with surface 56. Surface 56 lies in a plane that is substantially transverse to the longitudinal axis of rod 28 to prevent over travel of the lock washers 48 when the pusher member 40 is in the position shown in FIG. 8.

Figure 10:
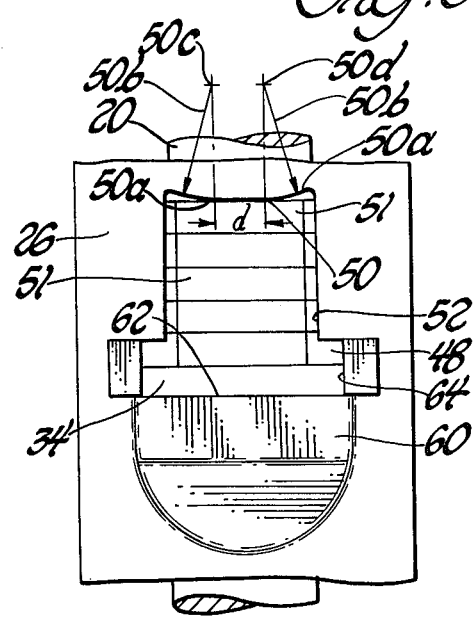
FIG. 10 is a view along lines 10—10 of FIG. 8.

As shown particularly in FIGS. 7, 8 and 10, the slot 52 extends along the outer wall of the tubular housing 26 in the direction of the longitudinal axis thereof. The fulcrum 50 is formed by a first end portion of the slot 52 and is located on the wall of the tubular housing 26 at the outer cross-sectional boundary thereof. The wall of the housing is deformed to form an inwardly depressed portion 60 that projects inwardly from the outer cross-sectional boundary of the wall of the housing. The second end portion 62 of slot 52 is located on the inwardly depressed portion 60. In the illustrated embodiment, as shown particularly in FIG. 10, the slot 52 is of generally T-shaped configuration with a T bar portion 64 formed adjacent the second end portion 62. The T bar portion 64 may be omitted.

The first end portion 50 defining the fulcrum has curved edge portions 50a (FIG. 10) such that the fulcrum 50 projects outwardly from the first end portion toward the second end portion 62 of the slot 52. The curved edge portions 50a as shown in FIG. 10 each have a radius 50b from centers 50c and 50d separated by a distance d as indicated in FIG. 10. The lever arm 51 of the lock washer 48 that engages the fulcrum 50 engages a relatively flat portion of the fulcrum 50 having a width corresponding to the distance d separating the centers 50c and 50d. The width d of the fulcrum 50 is less than the width of the lever arm 51. Since the contact portion having the width d of the fulcrum 50 projects outwardly from the edges of the first end portion toward the second end portion 62, the likelihood of sideways cocking of the washer 48 caused by manufacturing errors in the formation of the end portion 50 is minimized.

The plunger 34 is formed with a flat side portion 66 (FIGS. 7 and 8) which is seated on the inwardly depressed portion 60. The engagement of the flat portion 66 with the depressed portion 60 restrains the plunger 34 against rotation within the housing 26.

With reference to FIG. 4, a snap ring 70 is mounted in a groove formed in the rod member 28. One end of spring 32 is seated against the washer 68 and the other end is seated against the plunger 34. A snap ring 70 surrounds the rod 28 and is seated against the washer 68. In FIG. 4, the mechanism is indicated in its maximum extended position with the snap ring 70 seated against the washer 68. When the rod 28 is retracted into the housing 26, the spring 32 is compressed by movement of the snap ring 70 and washer 68 toward the plunger 34 to reduce the length of the spring 32. When the snap ring 70 engages the bushing 42, the rod 28 is in its maximum extended position and cannot extend further from the housing 26. The spring 32 is always in compression between the washer 68 and plunger 34 so that spring 32 urges the lock washers toward the lock position in any position of the rod 28.

The washers 48 have a configuration that permits ease of installation. As shown in FIG. 6a, the maximum dimension of each of the lock washers 48 in plan is less than the cross-sectional dimension of the inner surface of the tubular housing 26 in the undeformed portion thereof. The configuration of the washers 48 is such that they can be positioned on an installation rod (not shown) and inserted into the upper end of the tubular housing 26 (as viewed in FIG. 4) prior to the installation of the fitting 44—and hence prior to the swaging operation which secures fitting 44 to the housing. The washers are inserted by an installation rod with the washers positioned transversely of the longitudinal axis of the tubular housing until the lever arms 51 engage the edge 62 and then inserted into the slot 52. Rod 28 can then be inserted into the washers as the installation rod is removed.

As shown in FIG. 6a, the height h of the washer 48, which is the maximum outer dimension of the washer 48, is less than the inner diameter of the tubular housing 26. The lock washer 48 has a circular rod locking opening 75 for receiving the rod 28. The outer periphery of the lock washer 48 has first and second portions located on diametrically opposite sides of the center 76 of the rod locking opening. The first portion has a radius of curvature 73 that is eccentric to the radius of curvature 77 of the second portion. The center 74 of the curvature of the first portion is located between the lever arm 51 and the center 76 of the rod locking opening 75. The second portion of the outer periphery is concentric with the opening 75 since the radius 77 extends from center 76. The centers 74 and 76 are eccentric with each other by a distance indicated at e in FIG. 6a. The free end of the lever arm 51, in the illustrated embodiment, has a radius of curvature 78 concentric with the opening 75. As shown in FIG. 6a, the upper portion 72 of the washer 48 has less width than the lower portion because of the eccentricity of the radii 73 and 77.

The release means 40 comprises a pusher member in the form of a cylindrical projection on the end of a shaft 80 (FIGS. 4 through 6). The pusher member 40 is located eccentrically with respect to the axis of the shaft 80. An opening 82 (FIGS. 6 and 7) is formed in the wall of the housing 26, and the pusher member 40 only of the release means projects part way into the interior of the housing 26 through the opening 82. The pusher member 40 engages the friction lock washers 48 on the side opposite the base portion 36 of the plunger 34. The pusher member 40 engages the lock washers 48 on the opposite side of the rod 28 from the fulcrum 50.

The shaft 80 is selectively rotatable between active and inactive positions. The inactive position of the shaft 80, and hence the inactive position of the pusher member 40, is indicated in FIGS. 1, 3, 4, 5 and 7. In the inactive position, the lock washers 48 are in the lock position frictionally locking the rod 28 against movement relative to housing 26. The shaft 80 is shown in its active position in FIGS. 6, 8 and 9. When the shaft 80 is moved from the inactive to the active position, the pusher member 40 forces the lock washers 48 to the unlock position to release the rod 28 and permit movement of rod 28 relative to the housing 26. In the unlock position, the lock washers 48 are positioned transverse to the longitudinal axis of the rod so that the edges of the openings 75 are out of frictional engagement with the rod.

The release mechanism further includes a release return spring 84 connected between the release shaft 80 and the housing 26 biasing the shaft 80 to the inactive position. Thus, the shaft 80 is normally in the inactive position, and hence the lock washers 48 are normally biased to the lock position by spring 32. When the shaft 80 is rotated by its actuating handle 86 (FIG. 4) from its active position against spring 84, the lock washers are moved to the unlock position to permit adjustment of the seat.

The release means further includes a mounting bracket 87 having a barrel portion 88 formed with a bore 90 (FIG. 6) that receives the shaft 80. The barrel portion has inner and outer ends with the inner end disposed adjacent to the housing 26. The inner end of the barrel portion is formed with an enlarged recess 92 (FIGS. 5 and 6) surrounding the bore 90. One end of the shaft 80 projects into the recess 92.

Shaft securing means interconnects the shaft 80 and barrel portion 88 to prevent axial movement of the shaft 80 in the bore 90 but at the same time permit rotation of the shaft 80 and the bore 90. The shaft securing means includes a snap ring 94 (FIGS. 5 and 6) mounted on the end of the shaft 80 that projects into the recess 92 to prevent axial movement of the shaft 80 toward the outer end of the barrel portion. The shaft securing means further includes a pin 96 (FIGS. 2, 3 and 4) projecting radially from the shaft 80 at the outer end of the barrel portion 88 to prevent axial movement of the shaft toward the inner end of the barrel portion 88.

An arcuate groove 98 is formed on the outer end of the barrel portion 88. The pin 96 is received in the arcuate groove 98 and is engageable with the ends of the groove to limit the arc of rotation of shaft 80 between the active and inactive positions. The pin 96 is engaged with a shoulder defining one end 102 of the arcuate groove 98 when the shaft is in its inactive position. The pin 96 engages a shoulder defining the other end 100 of the arcuate groove 98 when the shaft 80 is rotated to its active position to cause the pusher member 40 to actuate the lock washers to the unlock position and release the rod 28.

The release spring 84 has one end 104 hooked over the pin 96 and its other end 106 projecting through an aperture formed in the bracket 87 and received in a recess 107 formed in the surface of the bracket adjacent the inner end of the barrel portion as illustrated in FIG. 4. The release spring 84 biases the pin 96 against the shoulder 102 of the arcuate groove 98 so that the shaft is in its inactive position, and hence the lock washers 48 are in the lock position, when the pin 96 engages shoulder 102.

The bracket 87 includes a curved saddle portion 106 (FIGS. 2 and 3) formed on one side of the barrel portion 88 and wrapped partially around the housing 26. The bracket 87 also includes a longitudinal arm portion 108 projecting from the other side of the barrel portion and extending lengthwise along the housing. Rivets 110 and 112 secure the bracket to the housing wall. The plunger 34 is formed with a slot 114 (FIGS. 7 and 8) for receiving the inner end of the rivet 112.

The point of engagement between the fulcrum 50 and the lever arm 51 of the adjacent washer and the rod 28 is sufficient to generate a locking couple on the rod equal to that of devices of this type having a larger outer diameter of conventional construction. The configuration of the fulcrum 50, as shown in FIG. 10, is such as to minimize sideways cocking of the lock washers so that the frictional engagement between the lock washers and the rod is at the top and bottom of the rod with respect to the fulcrum 50. The construction permits the tubular housing 26 to have a smaller diameter than is the case with conventional seat positioners of this type.

The construction of the release mechanism permits ease of assembly of the seat positioner. The release mechanism including the bracket 87, shaft 80, etc. can be assembled as a unit on the tubular housing 26 with ease since only the pusher member projects through the opening 82.

While a specific form of the invention is illustrated in the accompanying drawings and described in the foregoing specification, it should be understood that the invention is not limited to the exact construction. To the contrary, modifications in the construction and arrangement of parts, all falling within the scope and spirit of the invention, will be apparent to those skilled in the art.

The embodiments of the present invention in which an exclusive property or privilege is claimed are defined as follows:

1. Seat positioning mechanism of the type including an elongated housing having a rod slidably received therein for telescopic movement with respect to said housing between extended and retracted positions with friction lock means received in said housing and having a lock position tilted about a fulcrum in frictional engagement with said rod to frictionally restrain said rod against movement with respect to said housing in any selected position between the retracted and extended positions, and an unlock position disposed substantially transverse to said rod and out of frictional engagement with said rod to permit free movement of said rod with respect to said housing, and rod locking and biasing means interconnecting said housing, rod and friction lock means to urge said friction lock means toward the lock position; wherein the improvement comprises a slot formed in the wall of said housing intermediate the ends thereof, said slot having first and second end portions extending transversely of the longitudinal axis of said housing, said first end portion being located on said wall at the outer cross-sectional boundary of said housing so that the fulcrum is spaced from the longitudinal axis of the rod the maximum distance allowed by the cross section of the housing, said first end portion having a central portion defining the fulcrum for said friction lock means, the outer wall of said housing being deformed to form an inwardly depressed portion projecting inwardly from said outer boundary of said housing, said second end portion being located on said inwardly depressed portion; and wherein said friction lock means comprises at least one lock washer having a rod locking opening receiving said rod and a lever arm projecting from its outer periphery into said slot between said first and second end portions thereof for enaging said fulcrum such that the edge of said rod locking opening frictionally engages said rod in the tilted, lock position of said lock washer, said rod locking opening being larger than said rod to permit said free movement of said rod in the transverse unlock position of said lock washer, said central portion of said first end portion that defines the fulcrum being the only portion of said first end portion that contacts said lever arm to minimize lateral cocking of said lock washers about an axis passing through the center of the lock washer and the lever arm thereof.

2. Mechanism as claimed in claim 1 wherein said first end portion has curved edge portions such that the fulcrum projects outwardly from said first end portion lengthwise in parallel relationship with the longitudinal axis of said rod toward said second end portion of said slot, and widthwise in the direction transverse to the longitudinal axis of said rod, and wherein said lever projects lengthwise in a generally radial direction with respect to the longitudinal axis of said rod, and the width of the portion of the fulcrum that contacts said lever arm is less than the width of said lever arm.

3. Mechanism as claimed in claim 2 wherein said housing is tubular, and wherein the maximum dimension of said lock washer in plan is less than the cross-sectional dimension of the inner surface of said housing in the undeformed portion thereof.

4. Seat positioning mechanism of the type including an elongated housing having a rod slidably received therein for telescopic movement with respect to said housing between extended and retracted positions with friction lock means received in said housing and having a lock position tilted about a fulcrum in frictional engagement with said rod to frictionally restrain said rod against movement with respect to said housing in any selected position between the retracted and extended positions, and an unlock position disposed substantially transverse to said rod and out of frictional engagement with said rod to permit free movement of said rod with respect to said housing, and rod locking and biasing means interconnecting said housing, rod and friction lock means to urge said friction lock means toward the lock position; wherein the improvement comprises a slot formed in the wall of said housing intermediate the ends thereof, said slot having first and second end portions extending transversely of the longitudinal axis of said housing, said first end portion being located on said wall at the outer cross-sectional boundary of said housing and defining the fulcrum for said friction lock means, the outer wall of said housing being deformed to form an inwardly depressed portion projecting inwardly from said outer boundary of said housing, said second end portion being located on said inwardly depressed portion; and wherein said friction lock means comprises at least one lock washer having a rod locking opening receiving said rod and a lever arm projecting from its outer periphery into said slot between said first and second end portions thereof for engaging said fulcrum such that the edge of said rod locking opening frictionally engages said rod in the tilted, lock position of said lock washer, said rod locking opening being larger than said rod to permit said free movement of said rod in the transverse unlock position of said lock washer; wherein said first end portion has curved edge portions such that the fulcrum projects outwardly from said first end portion toward said second end portion of said slot, and the width of the portion of the fulcrum that contacts said lever arm is less than the width of said lever arm; wherein said housing is tubular, and wherein the maximum dimension of said lock washer in plan is less than the cross-sectional dimension of the inner surface of said housing in the undeformed portion thereof; wherein said housing has a circular cross-section, and wherein said rod locking opening of said lock washer is circular and the outer periphery of said lock washer has first and second portions located on diametrically opposite sides of the center of said rod locking opening, and wherein said first portion has a radius of curvature that is eccentric to said second portion and to said rod locking opening with the center of curvature of said first portion located between said lever arm and the center of said rod locking opening.

5. Mechanism as claimed in claim 4 wherein said second portion is concentric with said rod locking opening.

6. Mechanism as claimed in claim 4 wherein said outer free end of said lever arm has a radius of curvature concentric with said rod locking opening.

7. Mechanism as claimed in claim 6 wherein said rod locking and biasing means comprises a return spring and locking plunger; said plunger having a base portion and a spring seat portion, said base portion engaging said friction lock means on the side thereof opposite said plunger, and said return spring having one end engaged with said rod and its other end engaged with the spring seat portion of said plunger to urge said friction lock means toward said lock position.

8. Mechanism as claimed in claim 7 wherein said plunger has an opening receiving said rod, and the outer periphery is formed with a flat surface complementary to and seated on said inwardly depressed portion of said housing.

9. Mechanism as claimed in claim 8 wherein a bushing is mounted in said one end of said housing with a rod receiving opening formed therein, and wherein a spring seat member is mounted on said rod between said bushing and said plunger, said spring being mounted between said spring seat member and said plunger, said spring seat member also defining a stop engageable with said bushing to define the maximum extended position of said housing and rod.

10. Mechanism as claimed in claim 9 further including release means mounted on said housing for selectively actuating said friction lock means to the unlock position against the force of said return spring.

11. Mechanism as claimed in claim 10 wherein said release means includes a shaft rotatable between an active position and an inactive position and a pusher member on the end of said shaft, said pusher member only projecting part way into said housing on the side of said friction lock means opposite the base portion of said plunger, said pusher member being engageable with said friction lock means to force said friction lock means to the unlock position when said shaft is rotated from the inactive to active position.

12. Mechanism as claimed in claim 11 further including a release return spring connected between said shaft and housing biasing said shaft to the inactive position.

13. Mechanism as claimed in claim 12 wherein said pusher member comprises a cylindrical projection on the end of said shaft located eccentrically with respect to the axis of said shaft.

14. Mechanism as claimed in claim 13 wherein said release means further includes a mounting bracket having a barrel portion with a bore receiving said shaft; one end of said shaft being received in said bore, said pusher member only projecting from said bore into said housing.

15. Mechanism as claimed in claim 14 further including shaft securing means interconnecting said shaft and barrel portion to prevent axial movement of said shaft in said bore but permit rotation of said shaft in said bore.

16. Mechanism as claimed in claim 15 wherein said barrel portion has inner and outer ends with the inner end disposed adjacent to said housing, and wherein the inner end of said barrel portion is formed with an enlarged recess surrounding said bore, said one end of said shaft projecting into said enlarged recess, and said shaft securing means includes a snap ring mounted on said one end of said shaft in said recess to prevent axial movement of said shaft in said bore toward the outer end of said barrel portion.

17. Mechanism as claimed in claim 16 wherein said shaft securing means further includes a pin projecting radially from said shaft at the outer end of said barrel portion to prevent axial movement of said shaft in said bore toward the inner end of said barrel portion.

18. Mechanism as claimed in claim 17 wherein an arcuate groove is formed on the outer end of said barrel portion, and said pin is received in said arcuate groove and is engageable with the ends of said groove to limit the arc of rotation of said shaft.

19. Mechanism as claimed in claim 18 wherein said pin is engaged with one end of said arcuate groove when said shaft is in the active position and is engaged with the other end of said groove when the shaft is in the inactive position, and further including a release spring connected between said pin and mounting bracket biasing said pin to engage said other end of said groove and hence said shaft to the inactive position.

20. Mechanism as claimed in claim 19 wherein a recess is formed in the surface of said bracket adjacent the inner end of said barrel portion, and an aperture communicates with said recess, and wherein one end of said release spring is inserted through said aperture into said recess, the other end of said release spring being connected with said pin.

21. Mechanism as claimed in claim 20 wherein said bracket includes a curved saddle portion formed on one side of said barrel portion and wrapped partially around said housing, and a longitudinal arm portion projecting from the other side of said barrel portion and extending lengthwise along said housing.

22. Seat positioning mechanism of the type including an elongated housing having a rod slidably received therein for telescopic movement with respect to said housing between extended and retracted positions with friction lock means in said housing and having a lock position tilted about a fulcrum in frictional engagement with said rod to frictionally restrain said rod against movement with respect to said housing in any selected position between the retracted and extended positions and an unlock position disposed substantially transverse to said rod and out of frictional engagement with said rod to permit free movement of said rod with respect to said housing; rod locking and biasing means interconnecting said housing, rod and friction lock means to urge said friction lock means toward the lock position, and release means for selectively actuating said friction lock means to the unlock position wherein the improvement comprises said release means including a shaft rotatable between an active position and an inactive position and a pusher member on the end of said shaft, said pusher member only projecting part way into said housing on the side of said friction lock means opposite said rod locking and biasing means, said pusher member being engageable with said friction lock means to force said friction lock means to the unlock position when said shaft is rotated from the inactive to active position.

23. Mechanism as claimed in claim 22 further including a release return spring connected between said shaft and housing biasing said shaft to the inactive position.

24. Mechanism as claimed in claim 23 wherein said pusher member comprises a cylindrical projection on the end of said shaft eccentrically with the axis of said shaft.

25. Mechanism as claimed in claim 24 wherein said release means further includes a mounting bracket having a barrel portion with a bore receiving said shaft; one end of said shaft being received in said bore, said pusher member only projecting from said bore into said housing.

26. Mechanism as claimed in claim 25 further including shaft securing means interconnecting said shaft and barrel portion to prevent axial movement of said shaft in said bore but permit rotation of said shaft in said bore.

27. Mechanism as claimed in claim 26 wherein said barrel portion has inner and outer ends with the inner end disposed adjacent to said housing, and wherein the inner end of said barrel portion is formed with an enlarged recess surrounding said bore, said one end of said shaft projecting into said enlarged recess, and said shaft securing means includes a snap ring mounted on said one end of said shaft in said recess to prevent axial movement of said shaft in said bore toward the outer end of said barrel portion.

28. Mechanism as claimed in claim 27 wherein said shaft securing means further includes a pin projecting radially from said shaft at the outer end of said barrel portion to prevent axial movement of said shaft in said bore toward the inner end of said barrel portion.

29. Mechanism as claimed in claim 28 wherein an arcuate groove is formed on the outer end of said barrel portion, and said pin is received in said arcuate grooves and is engageable with the ends of said grooves to limit the arc of rotation of said shaft.

30. Mechanism as claimed in claim 29 wherein said pin is engaged with one end of said arcuate groove when said shaft is in the active position and is engaged with the other end of said groove when the shaft is in the inactive position, and further including a release spring connected between said pin and mounting bracket biasing said pin to engage said other end of said groove and hence said shaft to the inactive position.

* * * * *